United States Patent
Noonan et al.

(10) Patent No.: US 12,018,907 B1
(45) Date of Patent: Jun. 25, 2024

(54) BARREL NUT

(71) Applicant: Firearm Consulting Group, LLC, Boise, ID (US)

(72) Inventors: Paul T. Noonan, Boise, ID (US); Dean Earl Sylvester, Boise, ID (US)

(*) Notice: Subject to any disclaimer, the term of this patent is extended or adjusted under 35 U.S.C. 154(b) by 0 days.

(21) Appl. No.: 16/913,654

(22) Filed: Jun. 26, 2020

Related U.S. Application Data

(60) Provisional application No. 62/866,957, filed on Jun. 26, 2019.

(51) Int. Cl.
- *F41A 21/48* (2006.01)
- *F16B 37/04* (2006.01)
- *F41C 23/16* (2006.01)

(52) U.S. Cl.
CPC ............ *F41A 21/48* (2013.01); *F16B 37/047* (2013.01); *F41C 23/16* (2013.01)

(58) Field of Classification Search
CPC ......... F16B 37/047; F41A 21/48; F41C 23/16
USPC ....................................................... 42/75.02
See application file for complete search history.

(56) References Cited

U.S. PATENT DOCUMENTS

| | | | |
|---|---|---|---|
| 7,523,580 B1* | 4/2009 | Tankersley | F41C 23/16 42/71.01 |
| 8,448,367 B2* | 5/2013 | Samson | F41A 13/12 42/75.02 |
| 8,464,457 B2* | 6/2013 | Troy | F41C 23/16 42/71.01 |
| 9,234,717 B2* | 1/2016 | Jarboe | F41G 11/003 |
| 9,453,694 B1* | 9/2016 | Storch | F41A 3/64 |
| 9,506,712 B2* | 11/2016 | Mather | F41A 21/485 |
| 9,631,889 B2* | 4/2017 | Geissele | B25B 13/50 |
| 9,683,808 B2* | 6/2017 | Gagnon | F41C 23/16 |
| 10,066,897 B2* | 9/2018 | Hwang | F41A 21/48 |
| 10,330,433 B2* | 6/2019 | Gottzmann | F41C 23/16 |
| 10,386,146 B2* | 8/2019 | Spector | F41G 11/003 |
| 10,386,149 B1* | 8/2019 | Facchini | F41A 5/26 |
| 10,401,122 B2* | 9/2019 | Williams | F41G 11/003 |
| 10,527,386 B2* | 1/2020 | Faxon | F41C 23/16 |
| 10,591,240 B2* | 3/2020 | Beachli | F41A 23/10 |
| 10,935,343 B2* | 3/2021 | Chin | F41A 11/00 |
| 2017/0097207 A1* | 4/2017 | Hines | F41C 23/16 |
| 2017/0299326 A1* | 10/2017 | Seekins | F41A 21/482 |
| 2018/0058807 A1* | 3/2018 | Cheng | F41A 5/26 |

* cited by examiner

*Primary Examiner* — Joshua E Freeman
*Assistant Examiner* — Benjamin S Gomberg

(57) ABSTRACT

A barrel nut is disclosed. The barrel nut contains an internal thread configured to engage a portion of lower receiver, a plurality of longitudinally-extending splines formed along an outer surface of the barrel nut, a plurality of longitudinally-extending channels formed along an outer surface of the barrel nut, wherein the splines and the channels operate to engage one or more protrusions of a handguard assembly and prevent rotation of the handguard assembly.

17 Claims, 19 Drawing Sheets

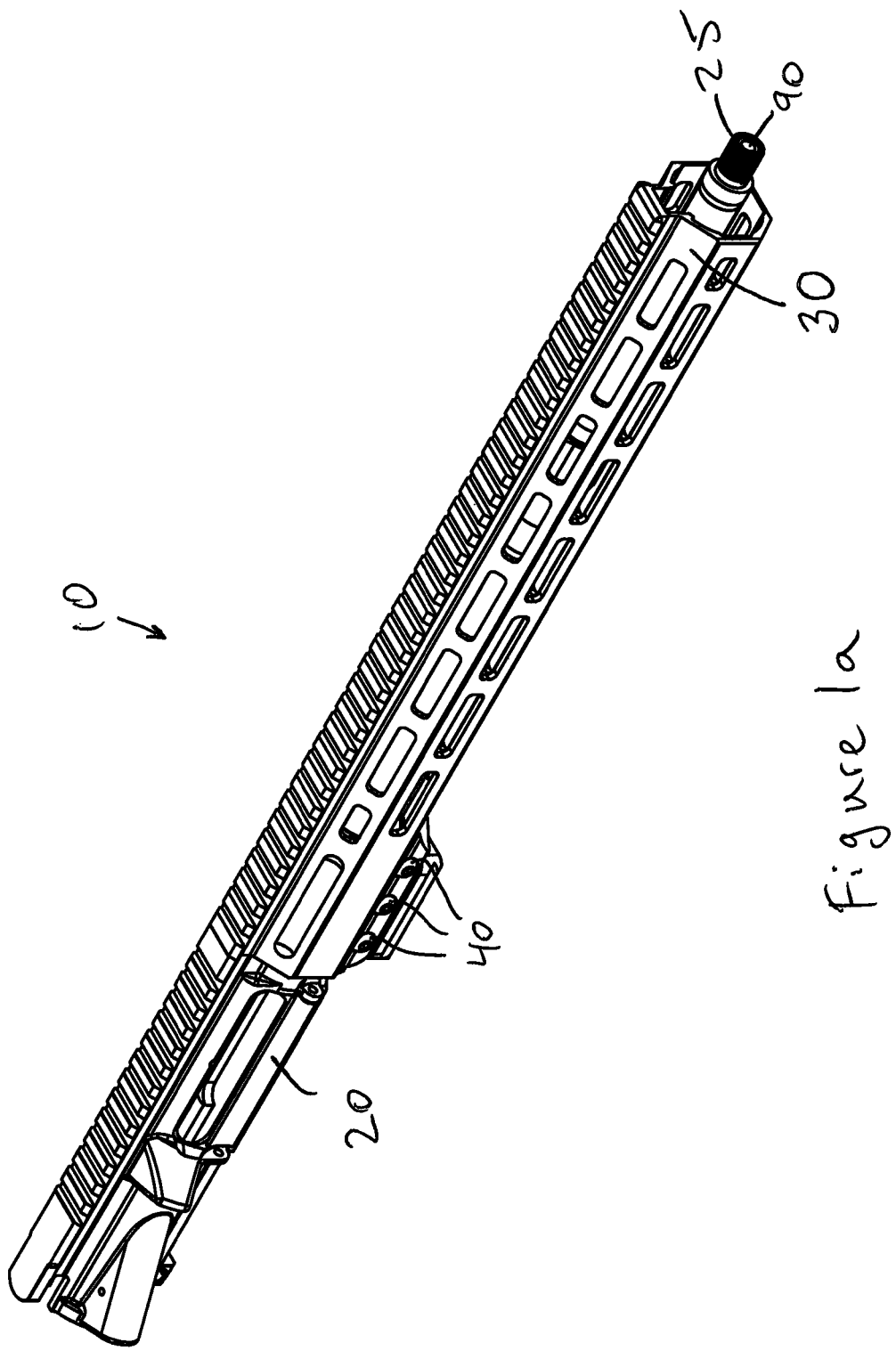

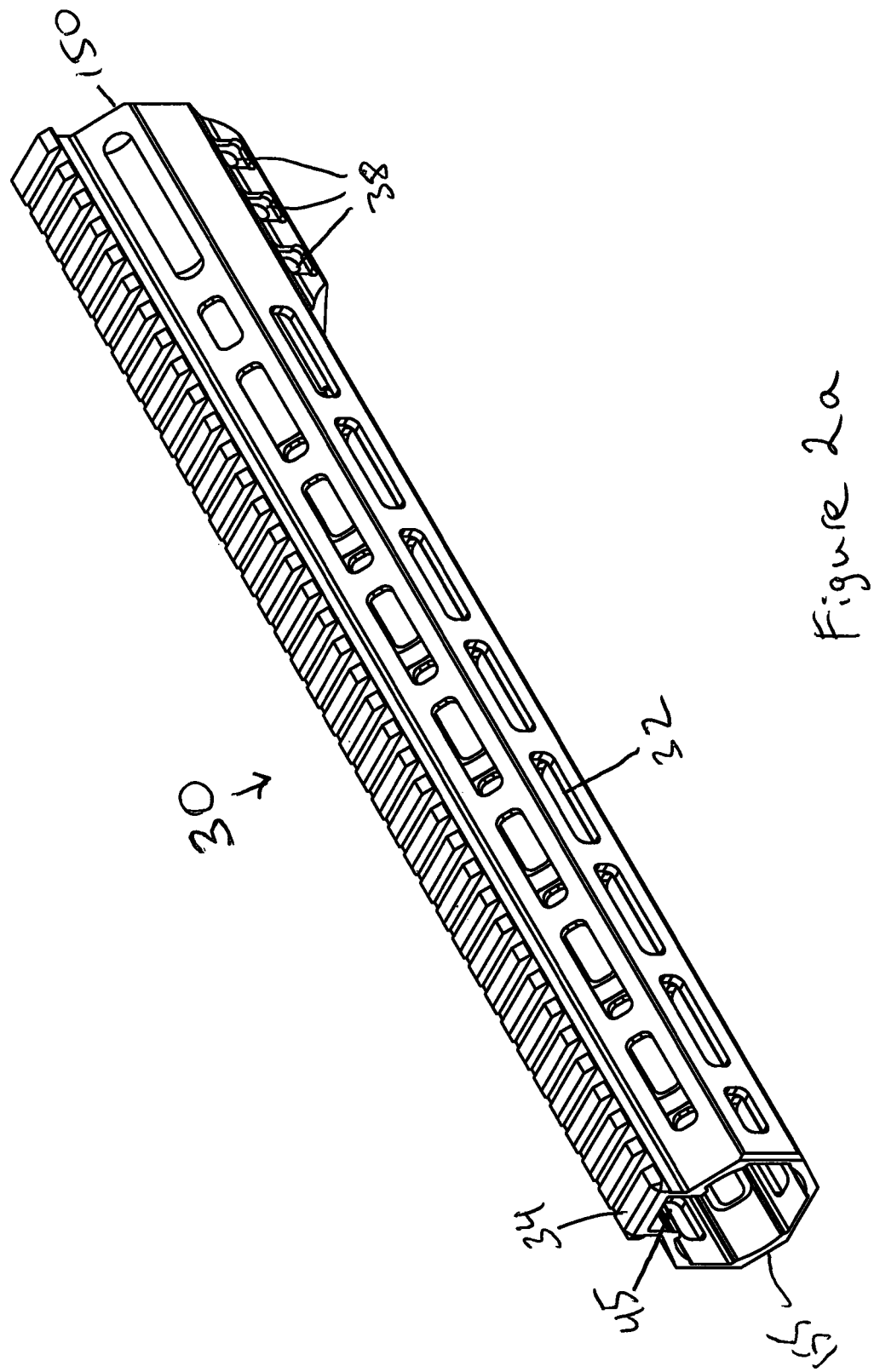

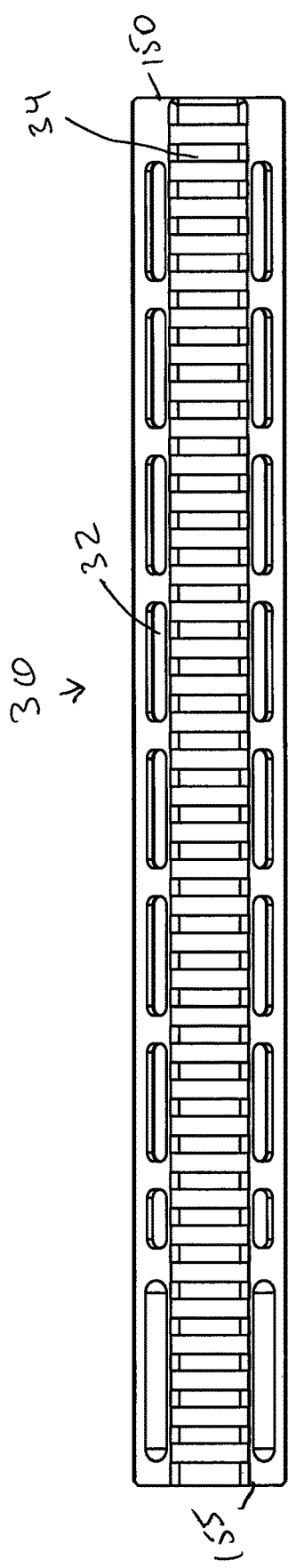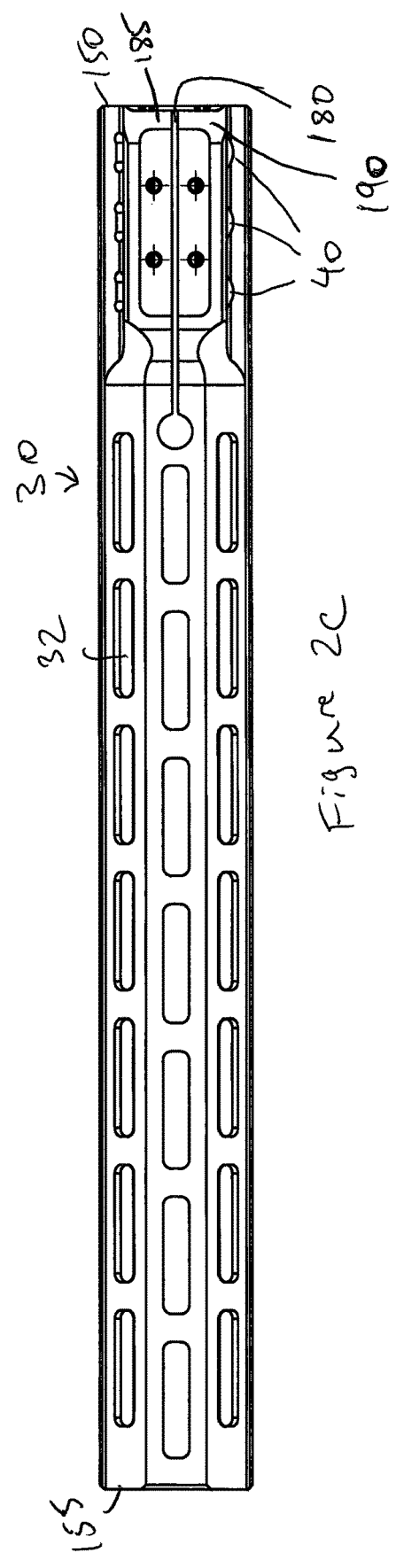

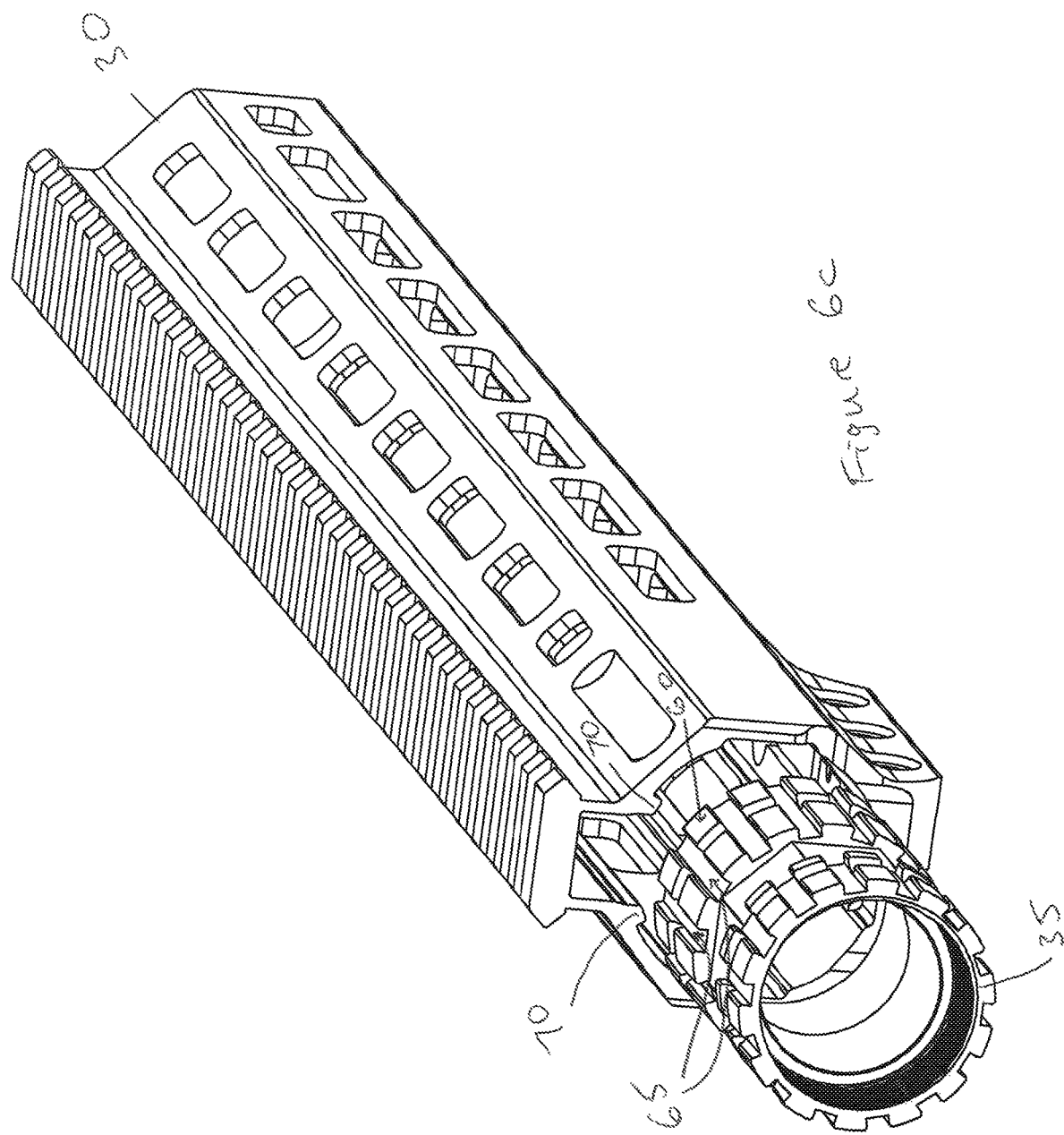

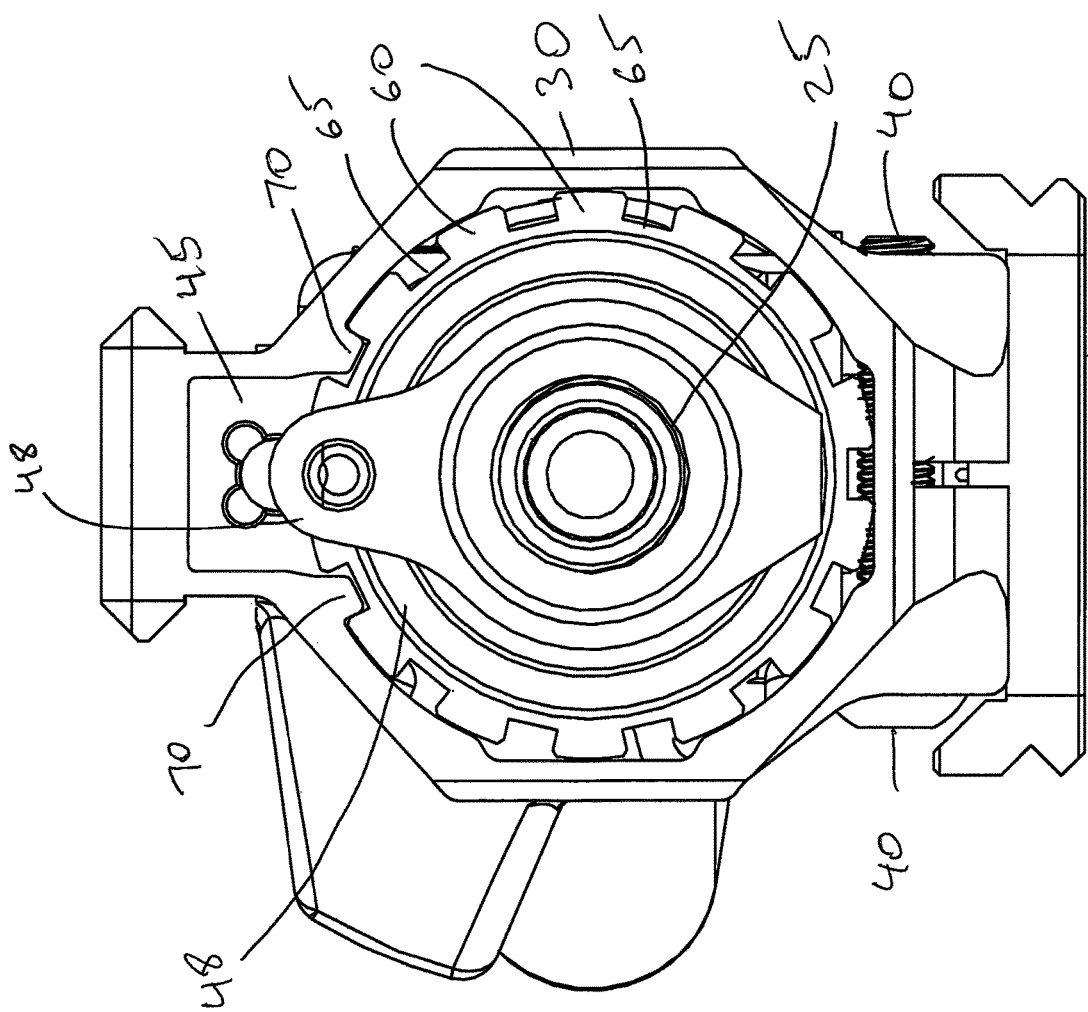

BARREL NUT

CROSS REFERENCE TO RELATED APPLICATIONS

This application claims the benefit of U.S. Provisional Application No. 62/866,957, filed on Jun. 26, 2019, which is incorporated herein by reference in its entirety.

FIELD

The present invention relates to a firearm. More particularly, the present invention relates to a firearm with a barrel nut.

BACKGROUND

The barrel of a firearm is typically formed separate from the receiver. As a result, the firearm includes some feature that allows the barrel to be connected to the receiver. As one example, a rearward end of the barrel is threaded and configured to screw into a corresponding threaded receptacle of the receiver. As another example, a separate barrel nut is used. The barrel nut slides over the barrel and has a threaded end that is screwed onto a corresponding threaded portion of the receiver.

When the barrel is connected to the receiver using a barrel nut, it is important that the barrel nut is secured with a proper torque or tension. If overly tightened, the barrel nut may be difficult to remove and the nut, barrel, or receiver could be damaged. If under tightened, the barrel nut may loosen over time.

BRIEF DESCRIPTION OF THE FIGURES

FIG. 1a depicts a portion of a firearm according to some embodiments presently disclosed.

FIG. 1b depicts an exploded view of the firearm shown in FIG. 1a.

FIG. 2a depicts a perspective view of a handguard assembly according to some embodiments presently disclosed.

FIG. 2b depicts a top view of the handguard assembly shown in FIG. 2a.

FIG. 2c depicts a bottom view of the handguard assembly shown in FIG. 2a.

FIG. 3a depicts a rear view of the handguard assembly shown in FIG. 2a.

FIG. 3b depicts a front view of the handguard assembly shown in FIG. 2a.

FIG. 6c depicts a perspective view of the handguard assembly and the barrel nut according to some embodiments presently disclosed.

FIG. 7 depicts a portion of a firearm according to some embodiments presently disclosed.

Figure 1B:
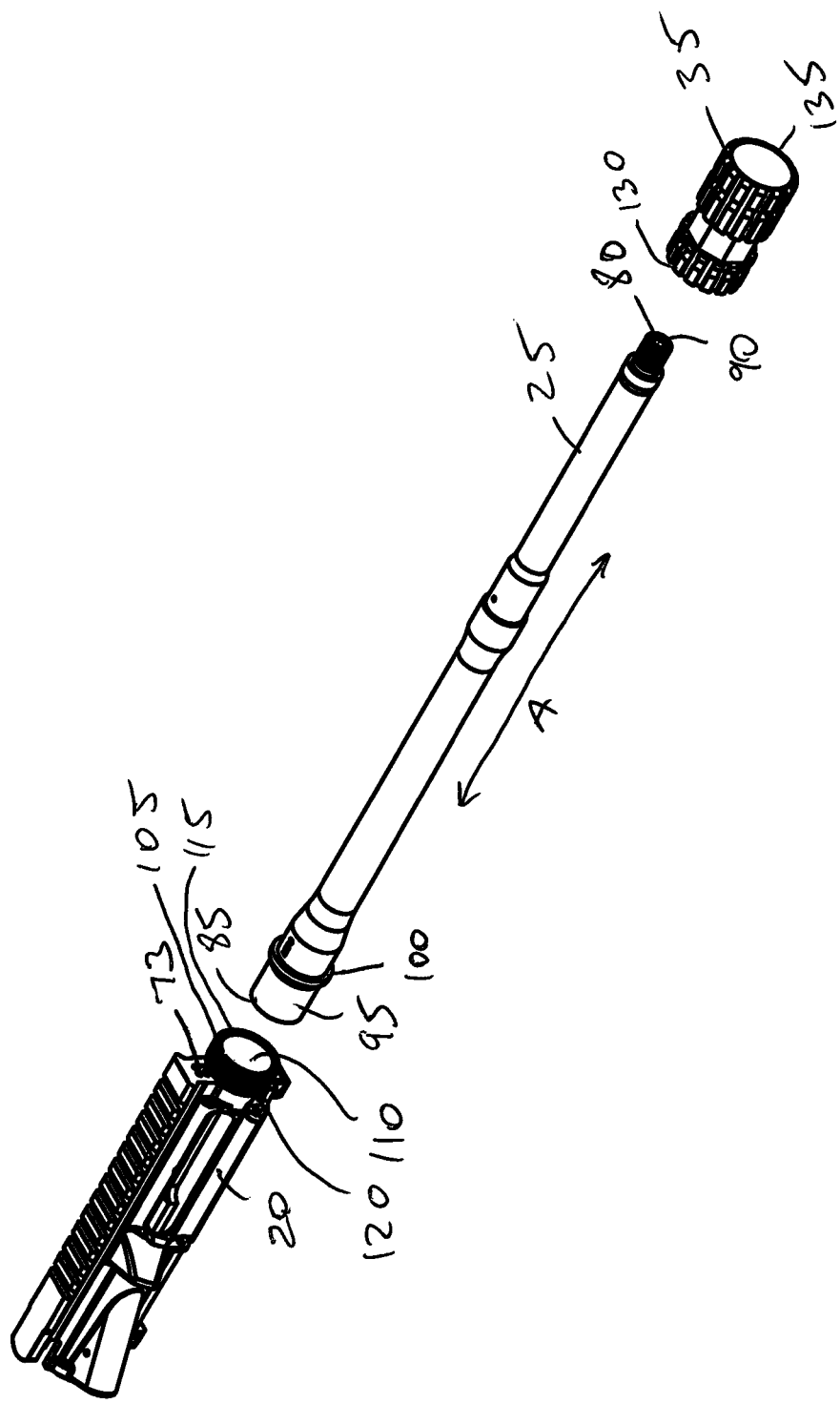
Figure 3B:
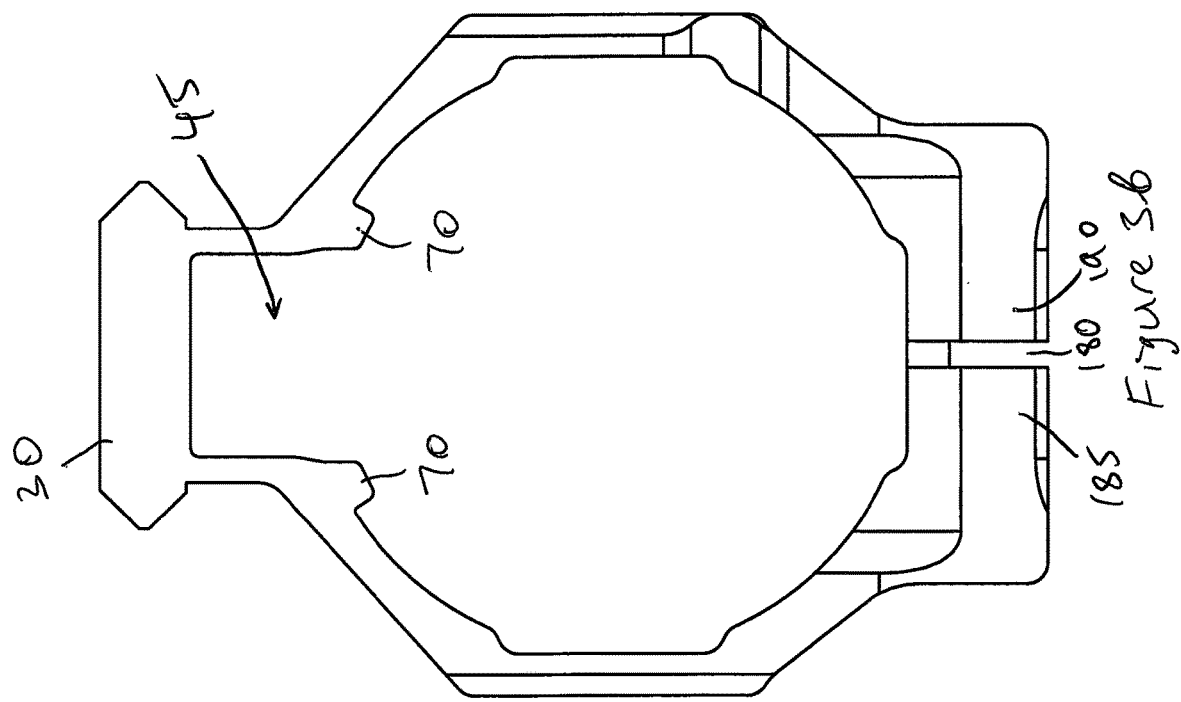
Figure 3A:
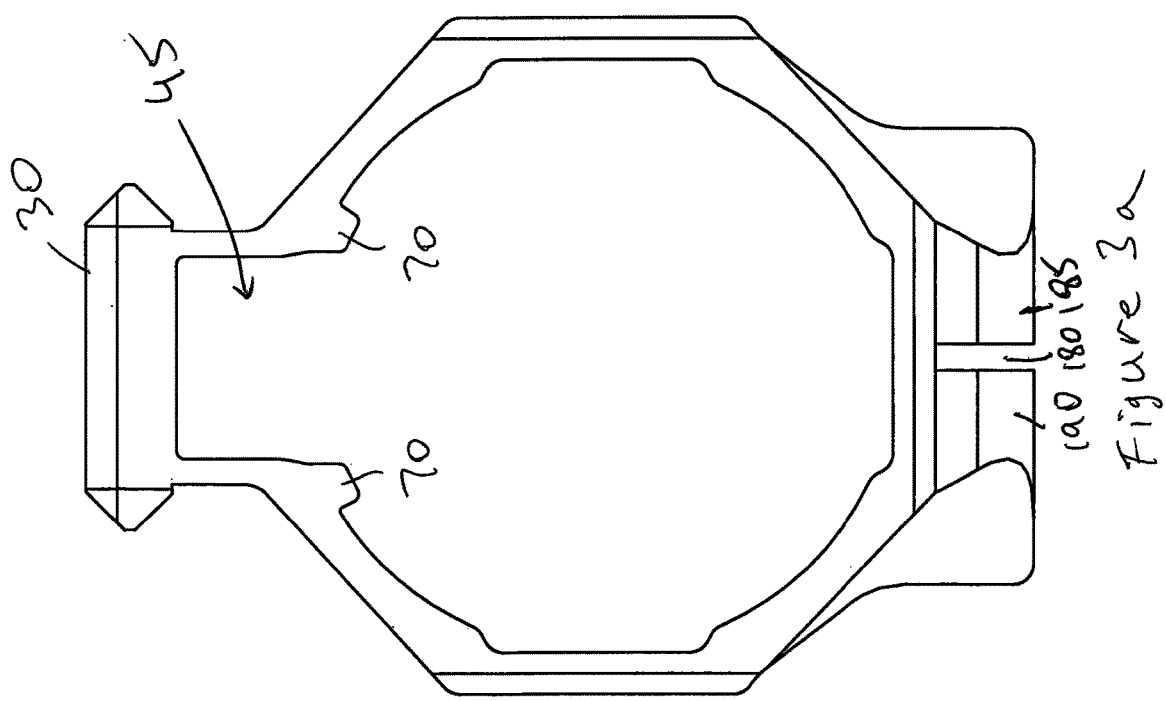

In the following description, like reference numbers are used to identify like elements. Furthermore, the drawings are intended to illustrate major features of exemplary embodiments in a diagrammatic manner. The drawings are not intended to depict every feature of every implementation nor relative dimensions of the depicted elements, and are not drawn to scale.

DETAILED DESCRIPTION

In the following description, numerous specific details are set forth to clearly describe various specific embodiments disclosed herein. One skilled in the art, however, will understand that the presently claimed invention may be practiced without all of the specific details discussed below. In other instances, well known features have not been described so as not to obscure the invention.

Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

In addition, it should be understood that embodiments of the invention include both hardware and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software. As such, it should be noted that a plurality of hardware and software-based devices, as well as a plurality of different structural components may be utilized to implement the invention. Furthermore, and as described in subsequent paragraphs, the specific mechanical configurations illustrated in the drawings are intended to exemplify embodiments of the invention and that other alternative mechanical configurations are possible.

FIGS. 1a-b depict a portion of a firearm 10 according to some embodiments presently disclosed. According to some embodiments, the firearm 10 comprises an upper receiver assembly 20 (shown in FIG. 1a-b), a barrel assembly 25 (shown in FIG. 1a-b), and a handguard assembly 30 (shown in FIGS. 1-2 and 3a-b).

Figure 4:
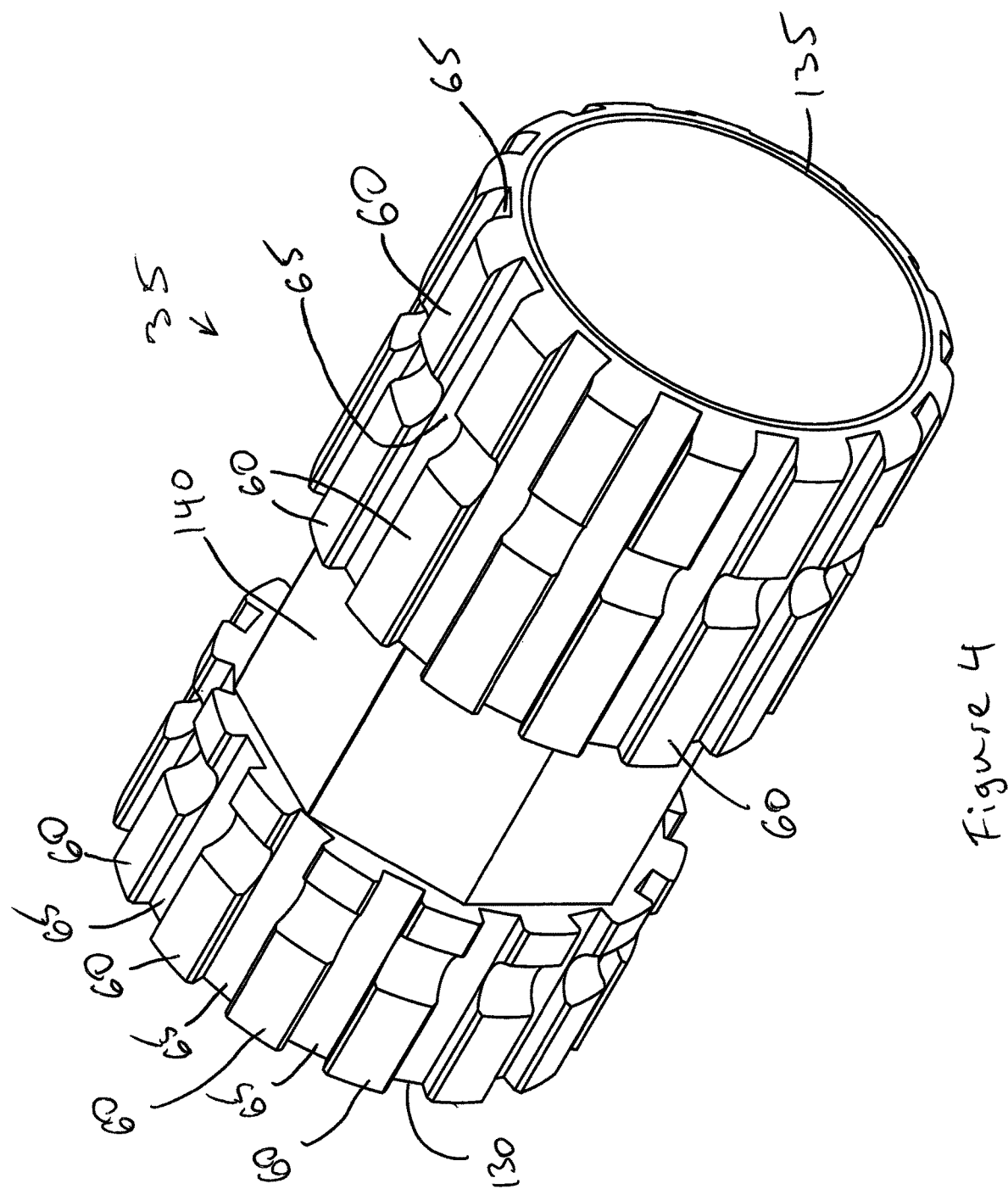
FIG. 4 depicts a barrel nut according to some embodiments presently disclosed.
Figure 5:
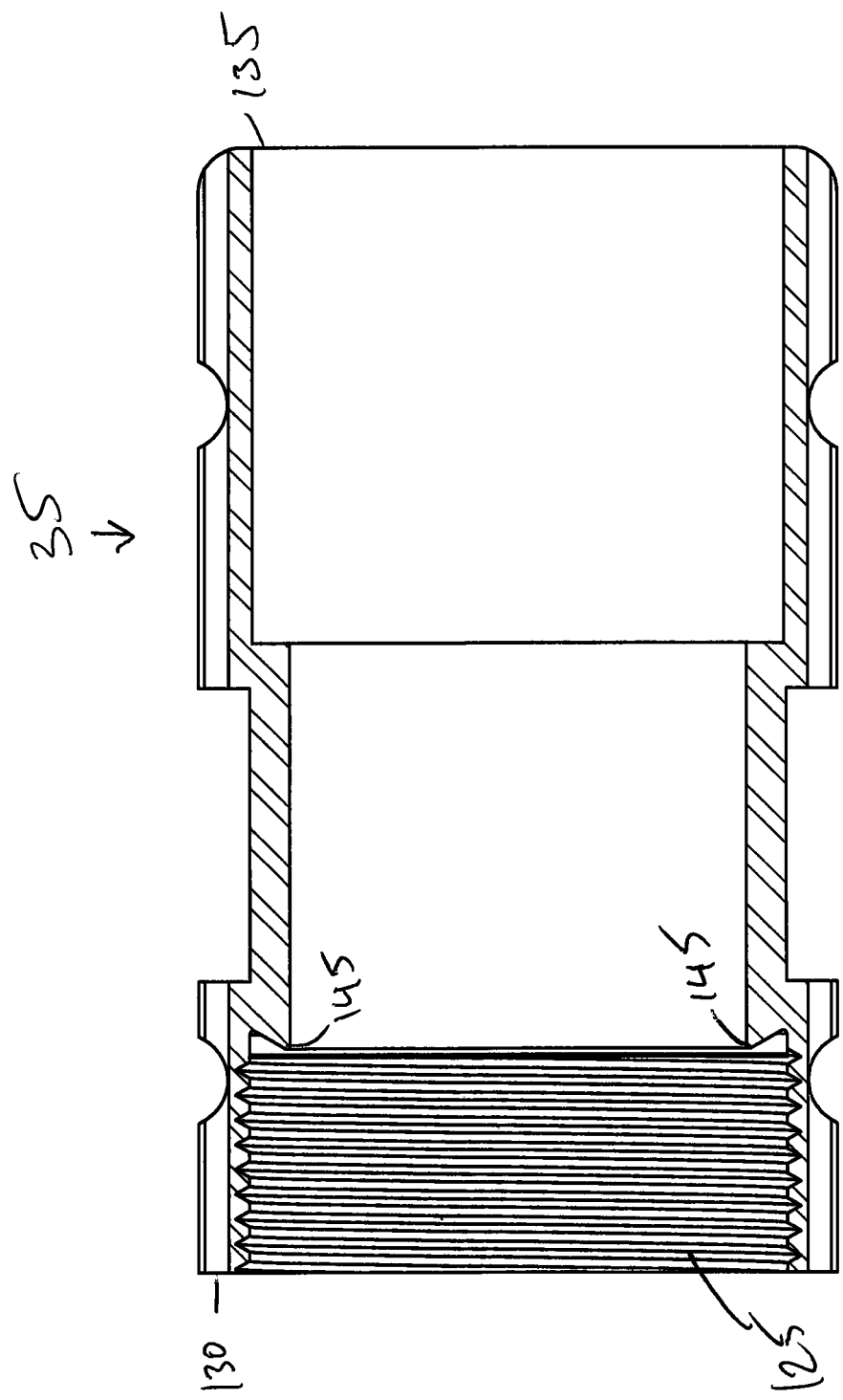
FIG. 5 depicts a cross-sectional view of the barrel nut shown in FIG. 4.
Figure 6B:
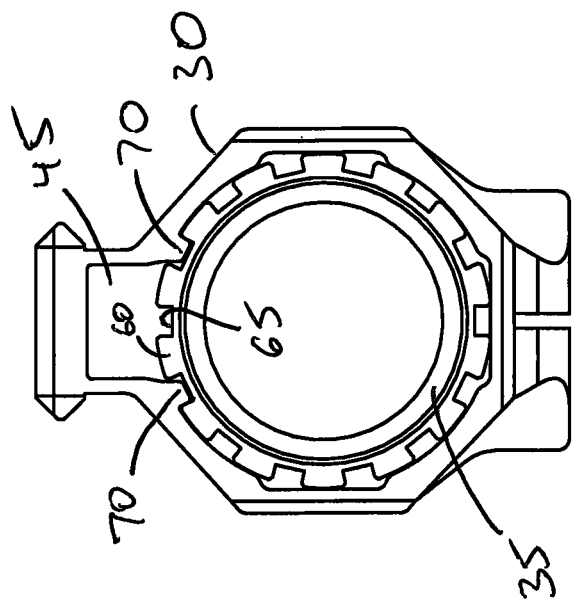
FIGS. 6a-b depicts the barrel nut engaging the handguard assembly according to some embodiments presently disclosed.
Figure 6A:
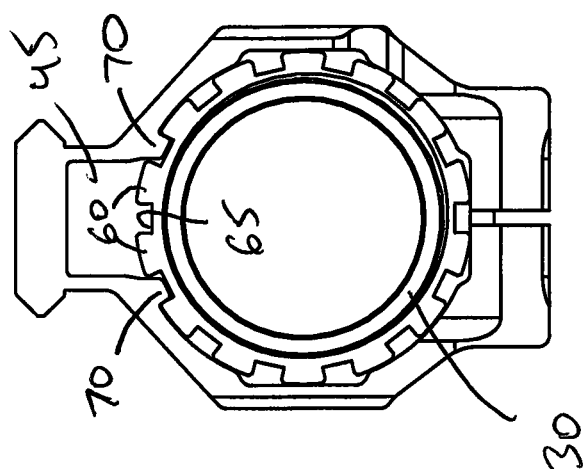

FIGS. 1b and 4-5 depict a barrel nut 35 according to some embodiments presently disclosed. According to some embodiments, the upper receiver assembly 20, the barrel, assembly 25, and the handguard assembly 30 are assembled using the barrel nut 35. According to some embodiments, the upper receiver assembly 20, the barrel, assembly 25, and the handguard assembly 30 are coupled together using the barrel nut 35. According to some embodiments, the barrel assembly 25 is coupled with the upper receiver assembly 20 using the barrel nut 35. According to some embodiments, the handguard assembly 30 is coupled with the barrel nut 35.

The firearm 10 can be of any type. Examples of the firearm 10 include, but are not limited to, handguns, rifles, shotguns, carbines, machine guns, submachine guns, personal defense weapons, automatic rifles, and assault rifles. According to some embodiments, the firearm 10 is an AR-15, M-16 or M-4 type rifle, or one of their variants. According to some embodiments, the firearm 10 is an AR-15 type rifle configured to shoot handgun caliber ammo.

According to some embodiments, the firearm 10 comprises a lower receiver assembly (not shown) coupled with the upper receiver assembly 20. The lower receiver assembly is configured to house a firing mechanism and associated components as found in, for example, AR-15, M-16 or M-4 type rifles and their variants. Such a firing mechanism typically includes a spring-biased hammer that is cocked and then released by a sear upon actuating a triggering mechanism. The hammer strikes a firing pin carried by a bolt located in the upper receiver assembly 20, which in turn is thrust forward to contact and discharge a cartridge loaded in a chamber. According to some embodiments, a portion of the expanding combustion gases traveling down the barrel 25 may be discharged off and used to drive the bolt rearward against a forward biasing force of a recoil spring for automatically ejecting the spent cartridge casing and automatically loading a new cartridge into the chamber from a magazine when the bolt returns forward. The upper receiver assembly 20 defines an internal longitudinally-extending cavity configured to receive a bolt assembly. The bolt assembly is slidably disposed in the cavity for axially reciprocating recoil movement therein. According to some embodiments, the upper receiver 20 is an AR-15, M-16 or M-4 type upper receiver, or one of their variants.

The lower receiver assembly (not shown) may include a buttstock (not shown), a handgrip (not shown), a trigger mechanism (not shown), and a magazine well (not shown). The buttstock provides a means for a shooter to firmly support the firearm 10 and easily aim it by holding the buttstock against his or her shoulder when firing. The handgrip provides a mechanism held by the shooter's hand, including when operating a trigger. The trigger mechanism is configured to actuate the firing sequence of the firearm 10 by operating the bolt assembly accommodated in the upper receiver 20. The magazine well is configured to detachably receive a self-feeding magazine for holding a plurality of cartridges. In at least one embodiment, the lower receiver is removably coupled to the upper receiver 20.

The barrel assembly 25 is configured to be coupled with the upper receiver assembly 20 and operates to provide a path to release an explosion gas and propel a projectile therethrough.

The handguard assembly 30 operates to provide a handgrip for a user of the firearm 10 and a space for accessories such as, for example, flashlights, laser pointers, rifle optics, and/or scopes. According to some embodiments, the handguard assembly 30 may comprise one or more coupling apertures 32 and/or one or more rails 34.

According to some embodiments, the handguard 30 is coupled to the firearm 10 for a user to grip the firearm 10 from the front and protects the user from the barrel 25, which becomes very hot when firing. According to some embodiments, the handguard 30 is engaged onto the barrel nut 35 and coupled thereto. According to some embodiments, the handguard 35 comprises one or more apertures 38 for fastening the handguard 30 with the barrel nut 35 with, for example, one or more fasteners 40 (shown in FIGS. 1a and 2c).

Figure 8:
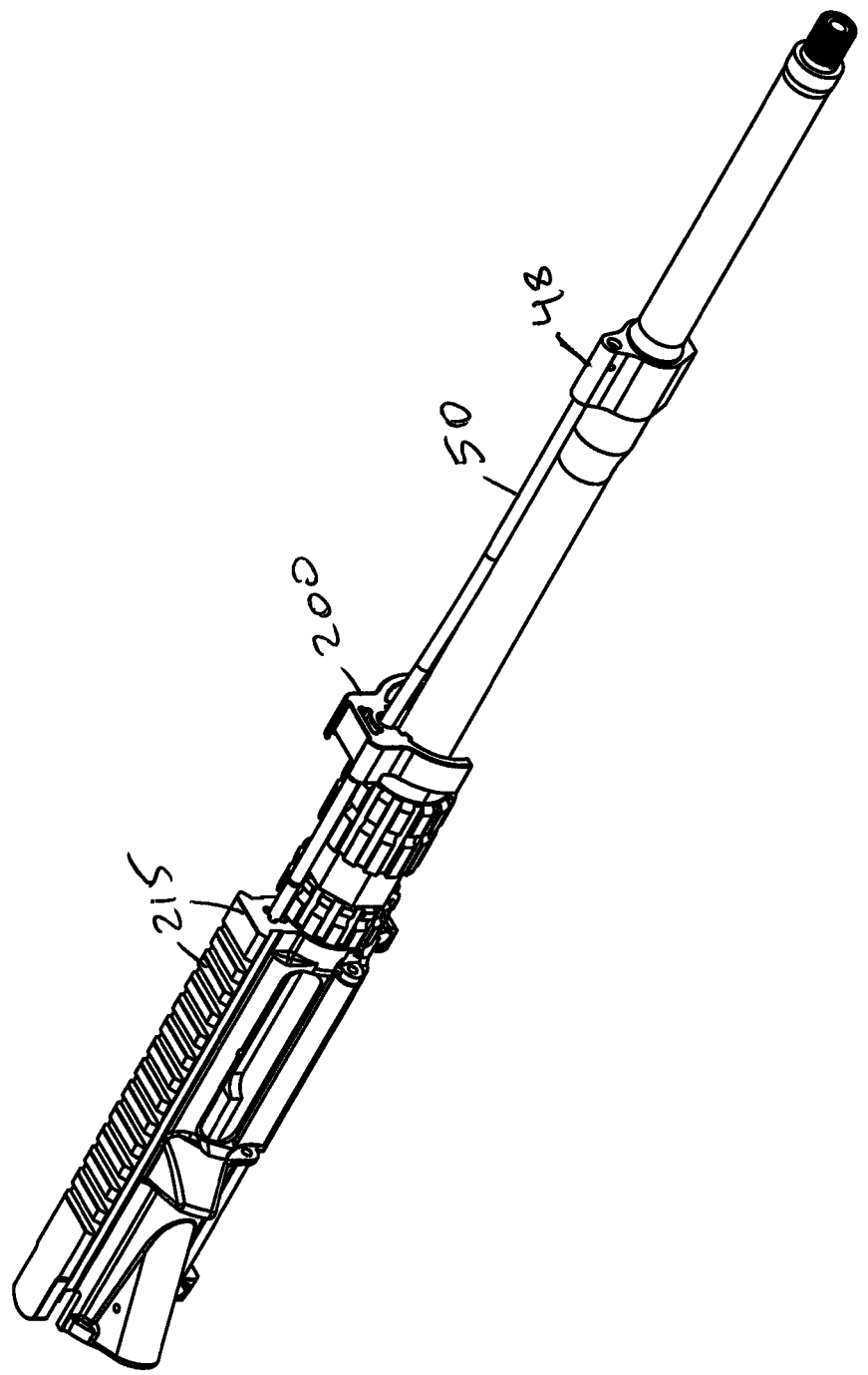
FIG. 8 depicts a portion of a firearm according to some embodiments presently disclosed.
Figure 9:
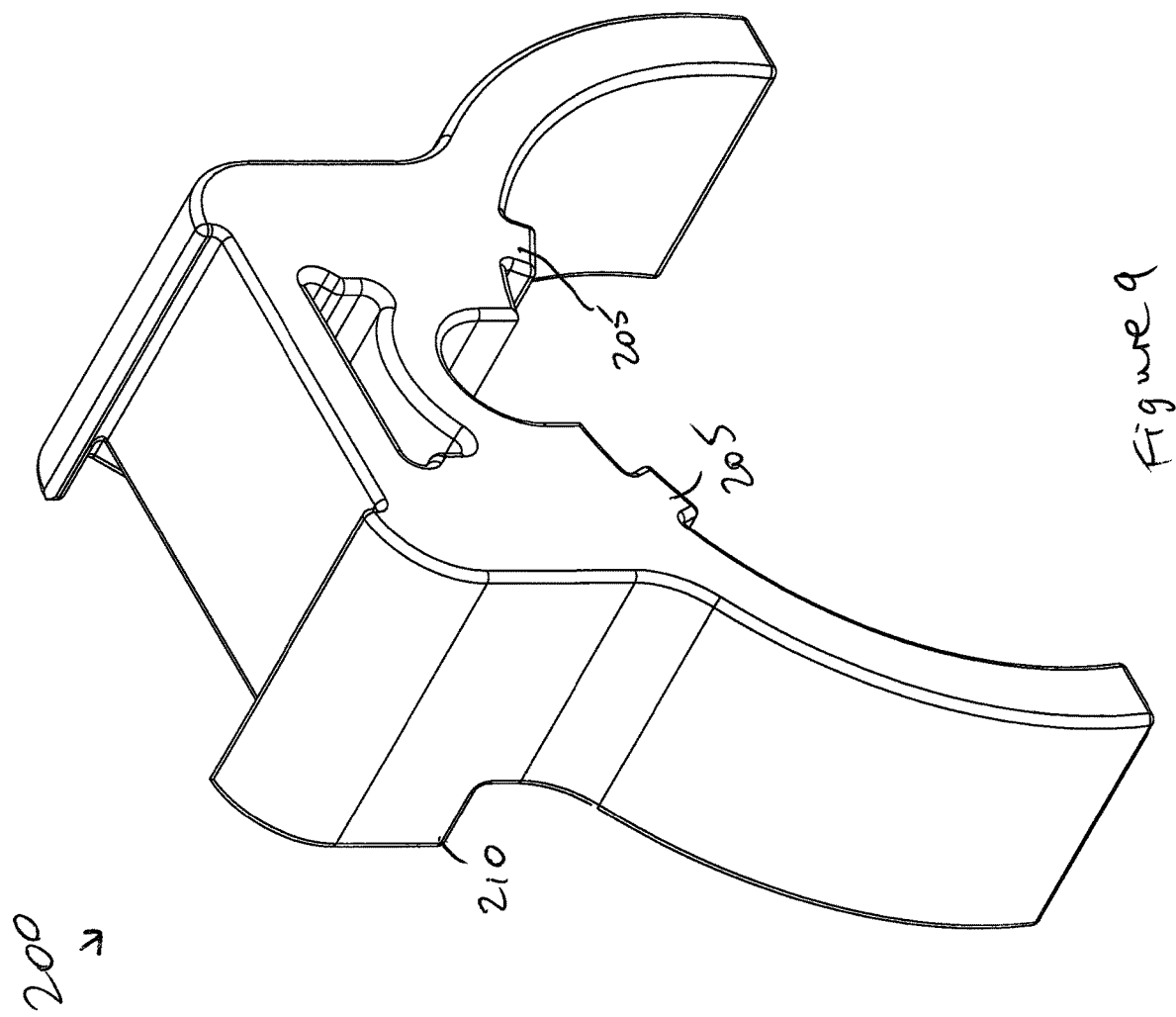
FIGS. 9-14 depict views of a tool according to some embodiments presently disclosed.
Figure 10:
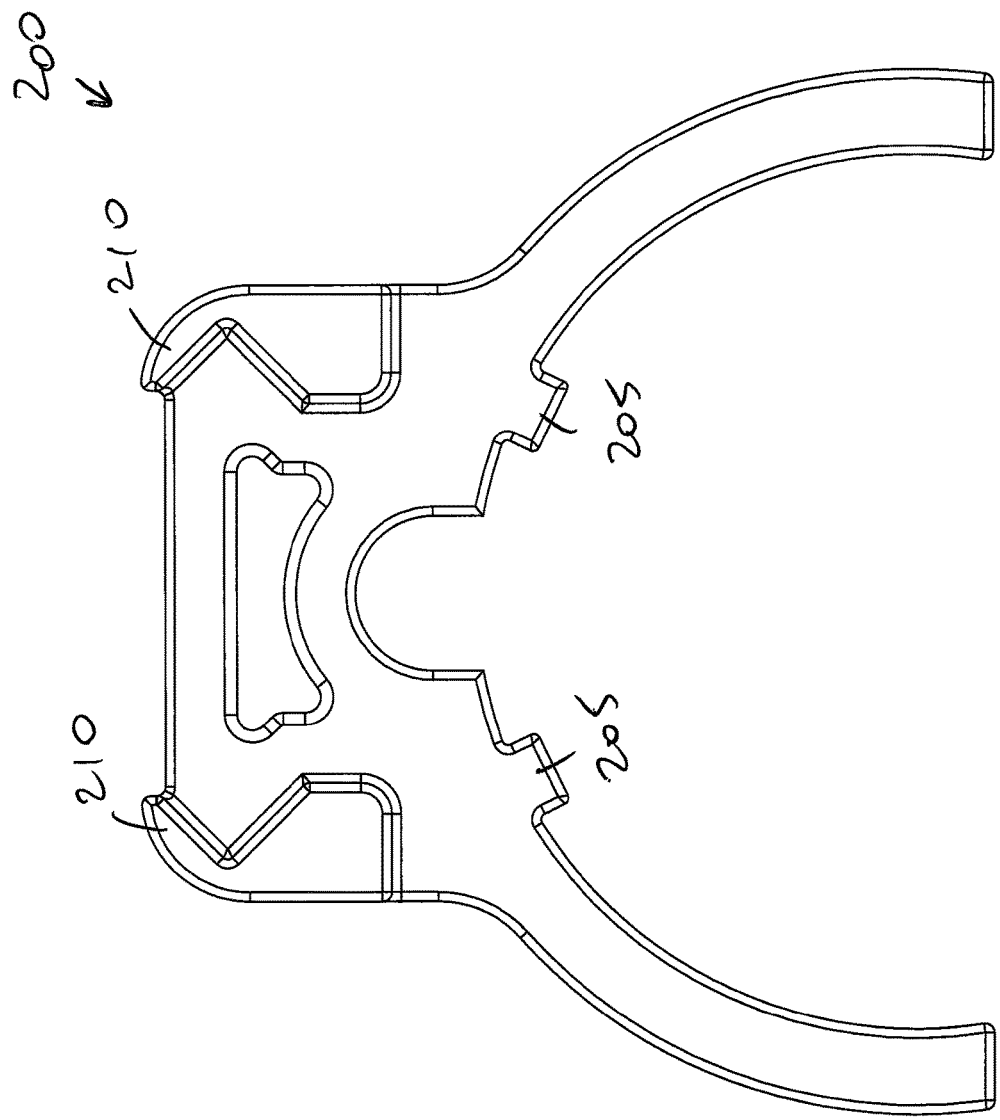
Figure 12:
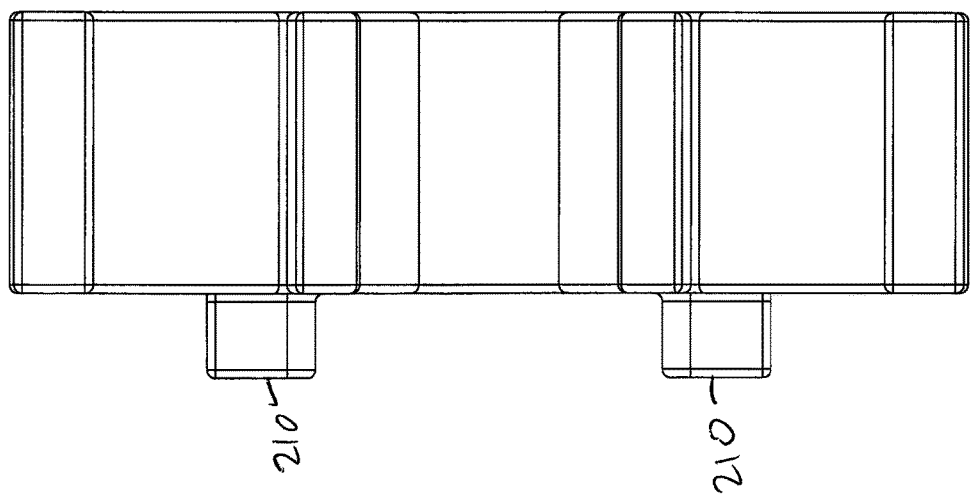
Figure 11:
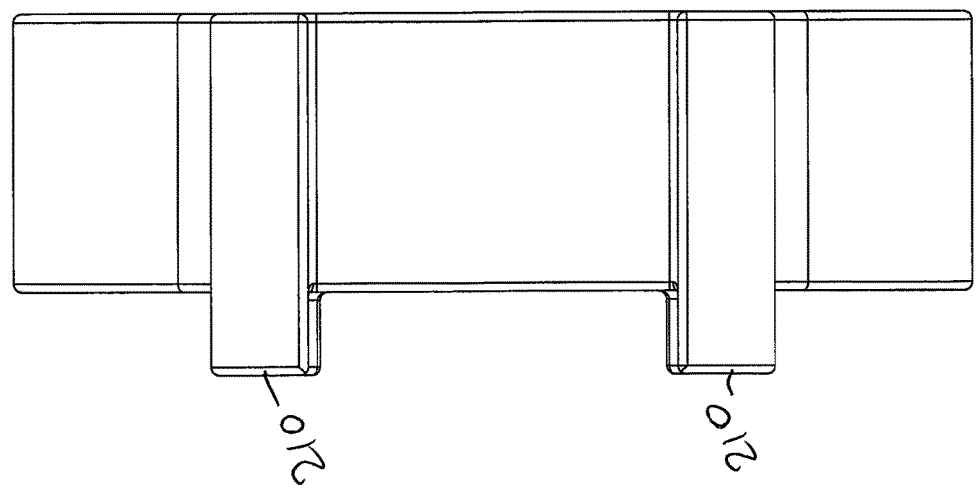
Figure 14:
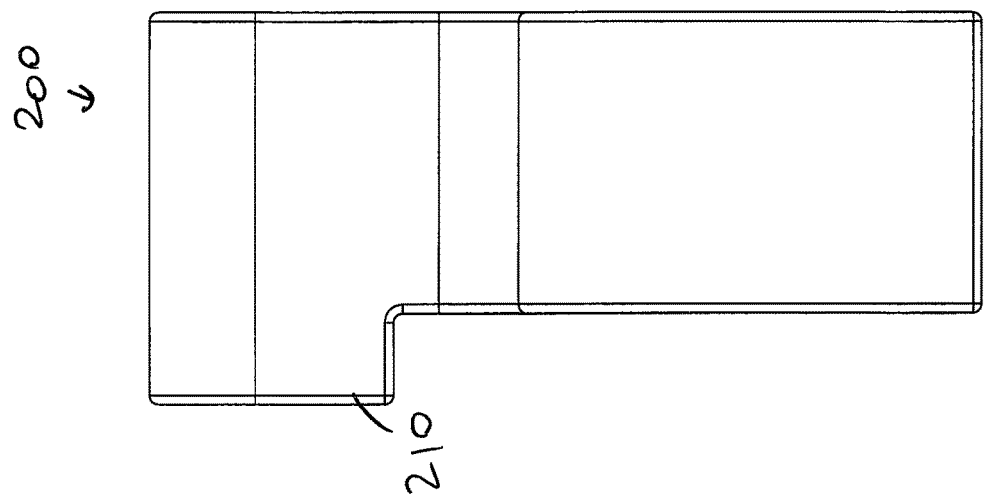
Figure 13:
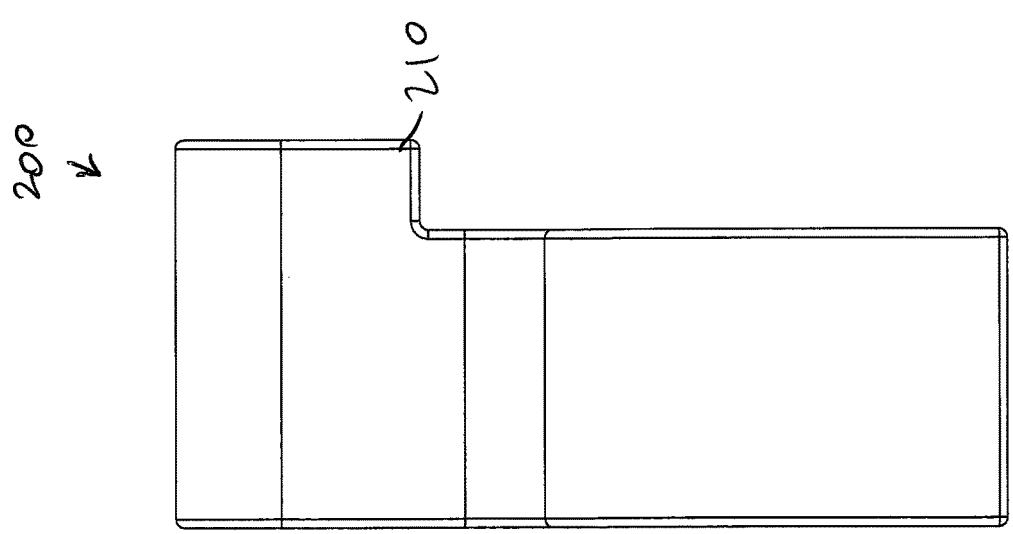
Figure 15:
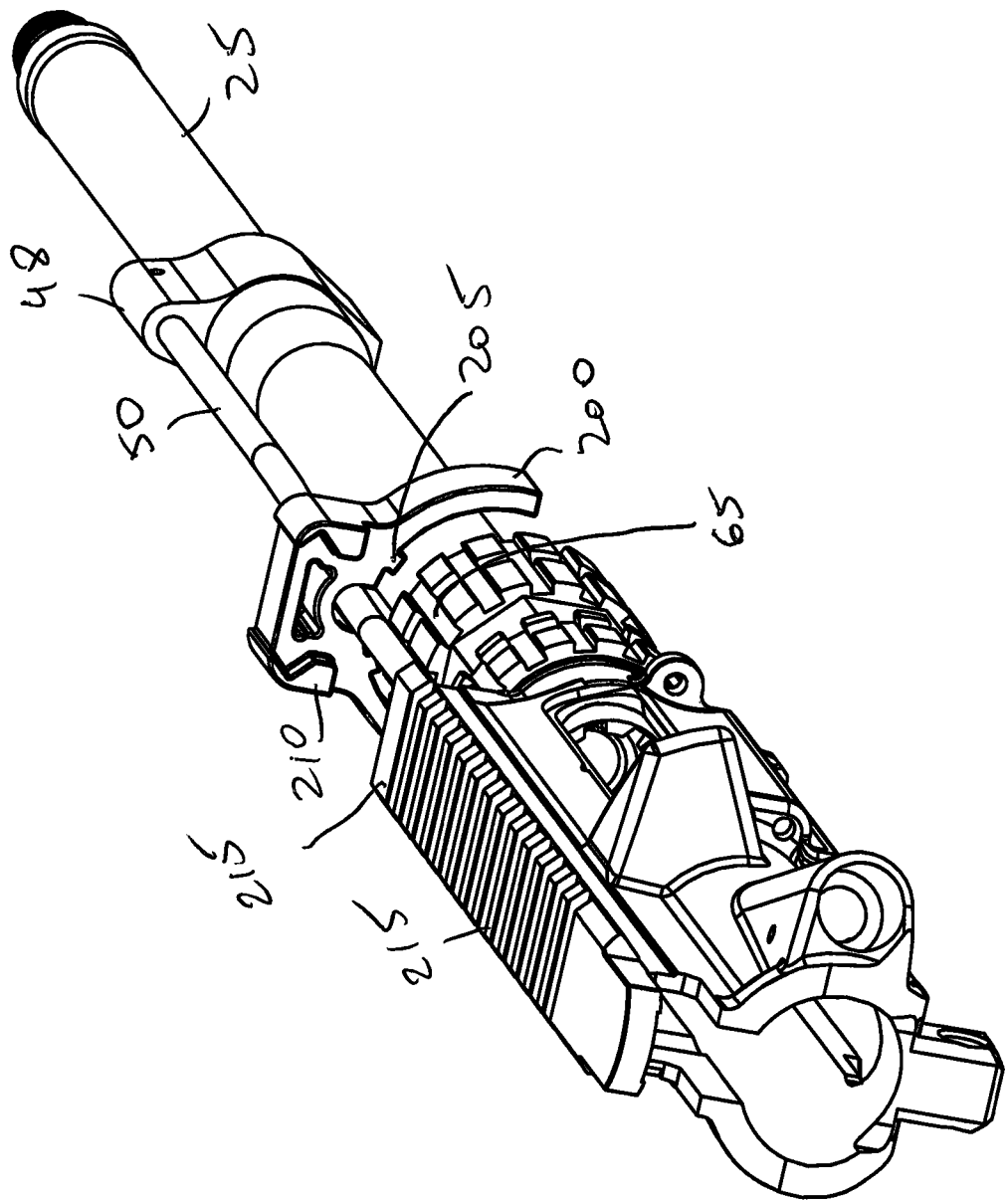
FIG. 15 depicts a portion of a firearm according to some embodiments presently disclosed.

According to some embodiments, the handguard 30 includes a gas tube slot 45, into which a gas block 48 and a gas tube 50 (shown in FIG. 8) are at least partially inserted when the handguard 30 is engaged onto the barrel nut 35.

According to some embodiments, the barrel assembly 25 provides a tube through which an explosion of gases is released to propel a projectile out of the muzzle at a high velocity. According to some embodiments, the barrel 25 is an AR-15, M-16 or M-4 type barrel. As described below, the barrel 25 is coupled to the upper receiver 20 by using the barrel nut 35.

According to some embodiments, the barrel nut 35 is configured to couple the barrel 25 with the upper receiver 20. According to some embodiments, the barrel nut 35 includes a plurality of longitudinally-extending splines 60 and a plurality of longitudinally-extending channels 65 formed between pairs of the splines 60 along the outer surface of the barrel nut 35. The splines 60 and the channels 65 operate to engage one or more protrusions 70 (shown in FIGS. 3a-b, 6a-b and 7) of the handguard assembly 30, as described below. According to some embodiments, the channels 65 are configured to accommodate the one or more protrusions 70. Thus, the barrel nut 35 must be properly aligned with the upper receiver 20 so that the one or more protrusions 70 are arranged in one or more of the channels 65 when the handguard 30 is coupled with the barrel nut 35.

According to some embodiments, the one or more protrusions 70 run the entire length of the handguard 30. According to some embodiments, the one or more protrusions 70 run a portion of the entire length of the handguard 30. According to some embodiments, the one or more protrusions 70 are formed during an extrusion process of the handguard 30.

According to some embodiments, the gas block 48 operates to regulate combustion gases from the fired cartridge. The gas block 48 is in fluid communication with the interior of the barrel 25 so that a portion of the expanding combustion gases trapped behind the bullet within the interior of the barrel 25 is bled off through the gas block 48. For example, the barrel 25 provides a gas port (not shown) at a location on which the gas block 48 is installed. The gas port allows the explosion gases to flow into the gas block 48 and, subsequently, into the gas tube 50.

According to some embodiments, the gas tube 50 operates to route the combustion gases back to the gas chamber of the upper receiver 20. According to some embodiments, the gas tube 50 is installed between the gas block 48 and the upper receiver 20 to provide fluid communication between the gas block 48 and the upper receiver 20. For example, the gas tube 50 is inserted into a gas tube hole 73 of the upper receiver 20 and a gas tube hole (not shown) of the gas block 48. This type of configuration is referred to as a gas direct type or direct impingement system, and typically used in AR-15, M-16 or M-4 type rifles. In this system, the combustion gases from the fired cartridge is discharged from the interior of the barrel 25 and directed back through the gas tube 50 to the breech area of the upper receiver 20 and into the gas chamber associated with a reloading mechanism of the bolt assembly in the gas chamber. The gas acts directly on the bolt carrier to power the reloading mechanism including a reciprocating bolt carrier that holds the bolt.

Figure 16:
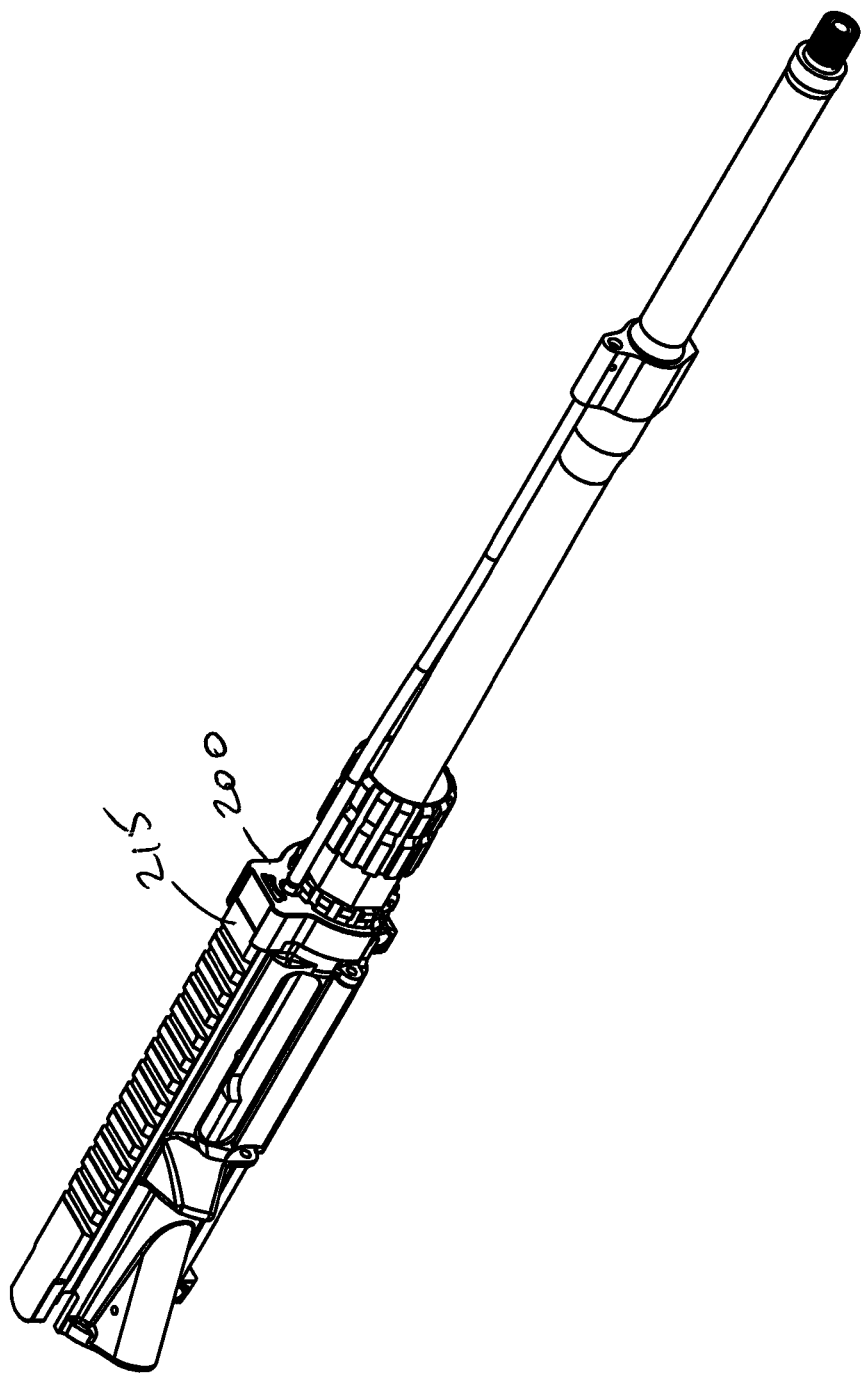
FIG. 16 depicts a portion of a firearm according to some embodiments presently disclosed.
Figure 17:
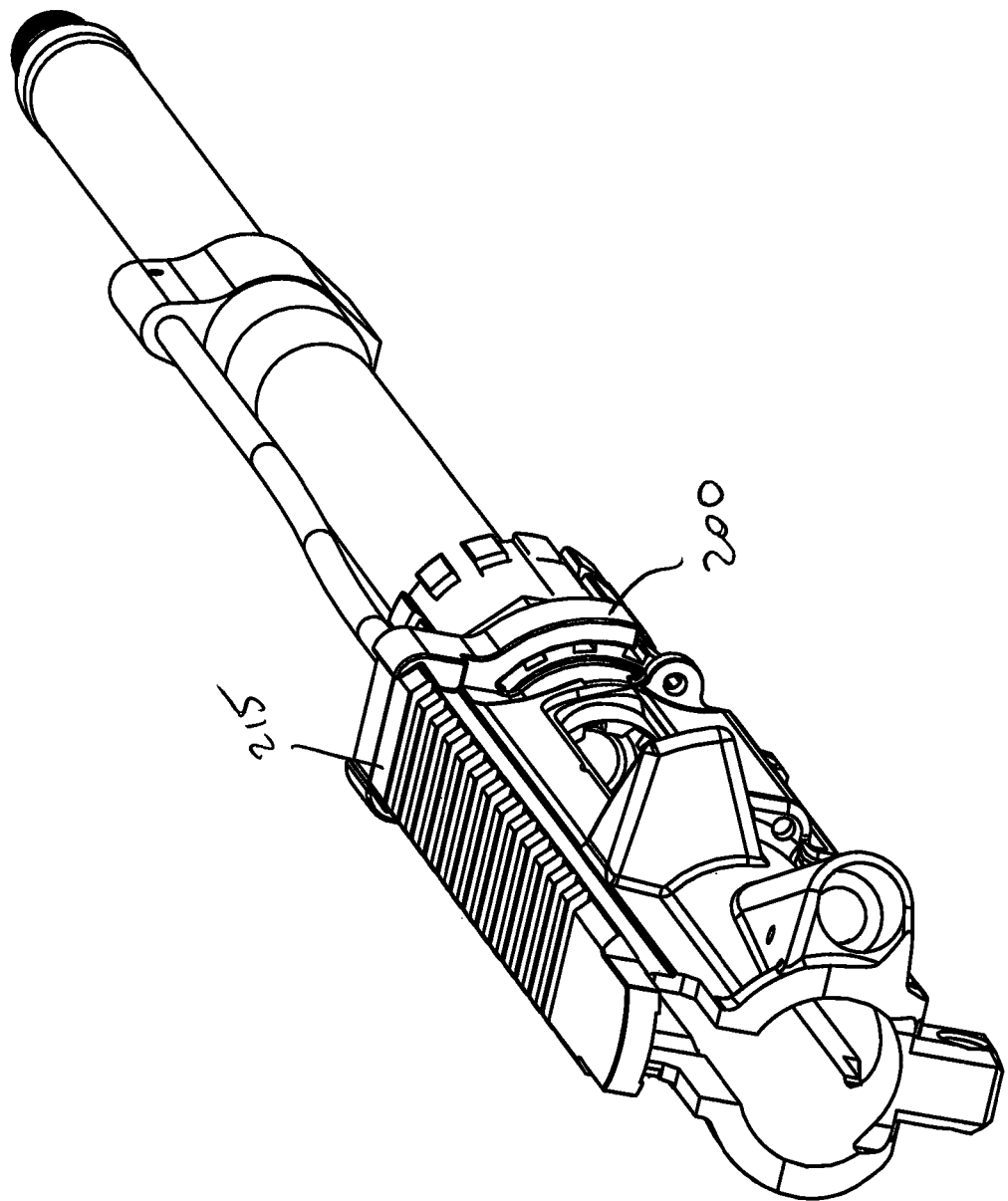
FIG. 17 depicts a portion of a firearm according to some embodiments presently disclosed.
Figure 18:
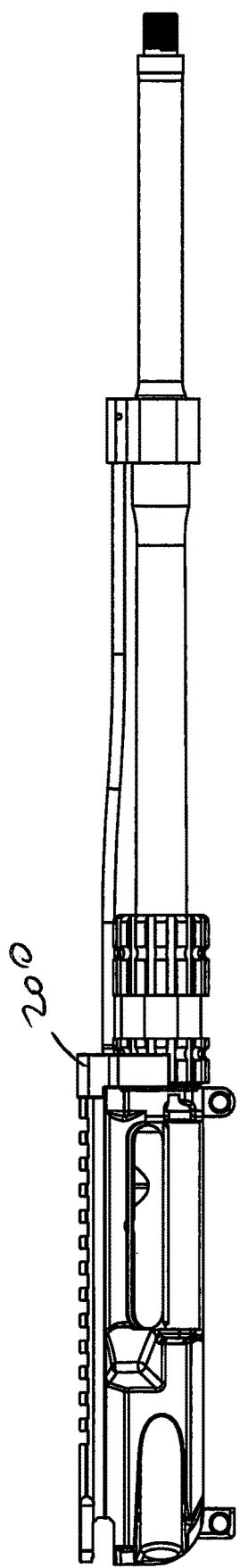
FIG. 18 depicts a portion of a firearm according to some embodiments presently disclosed.
Figure 19:
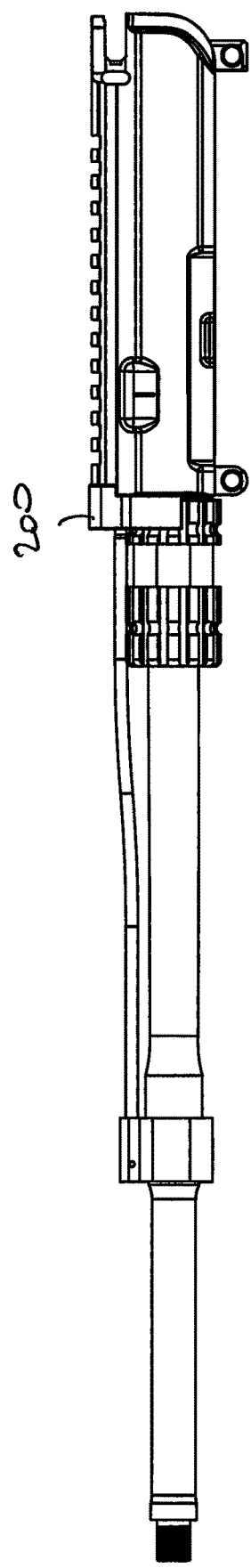
FIG. 19 depicts a portion of a firearm according to some embodiments presently disclosed.

According to some embodiments, where the gas tube 50 is connected between the gas block 48 and the upper receiver 20 along the length of the barrel 25, the gas tube 50 may abut with the barrel nut 35 as shown in FIG. 16. According to some embodiments, the gas tube 50 is accommodated in one of channels 65 of the barrel nut 35. Thus, the barrel nut 35 must be properly aligned with the upper receiver 20 so that the gas tube 50 is arranged on one of the channels 65 when the gas tube 50 is connected between the gas block 48 and the upper receiver 20. According to some embodiments, one of the channel 65 must be aligned with the gas tube hole 73 (shown in FIG. 1*b*) of the upper receiver 20. According to some embodiments, the barrel nut 35 may operate to provide proper tension between the barrel 25 and the upper receiver 20 when the barrel nut tightens the barrel 25 onto the upper receiver 20.

FIG. 1*b* is a perspective view of the barrel 25 and the upper receiver 20. According to some embodiments, a portion of the barrel 25 is inserted into the upper receiver 25. According to some embodiments, the barrel 25 is detachable from the upper receiver 20 for replacement.

According to some embodiments, the barrel 25 has a forward muzzle end 80 and a rearward breech end 85. The barrel 25 defines a longitudinal axis A for the firearm 10 and an inner bore 90 that forms an axial path for a bullet. According to some embodiments, a portion of the inner bore 90 includes rifling for imparting spin to the bullet when the firearm 10 is fired.

According to some embodiments, the barrel 25 includes an engaging portion 95 at the rearward breech end 85. The engaging portion 95 is configured to be inserted to the upper receiver 20 for support of the barrel 25 against the upper receiver 20. According to some embodiments, the barrel 25 may also include an annular engaging flange 100 extending outwardly from the barrel 25 adjacent the engaging portion 95. The engaging flange 100 is configured to abut the upper receiver 20 when the barrel 25 is inserted into the upper receiver 20.

According to some embodiments, the upper receiver 20 includes a mounting protrusion 105 extending from the front of the upper receiver 20. The mounting protrusion 105 defines a receiving bore 110 therein, which is in fluid communication with the chamber of the upper receiver 20. The receiving bore 110 is configured to receive the engaging portion 95 of the barrel 25. The mounting protrusion 105 has a lip 115 at the forward edge thereof, against which the engaging flange 100 of the barrel 25 is abutted when the barrel 25 is inserted into the upper receiver 20. The mounting protrusion further includes an externally threaded portion 120 for engaging internal threads 125 of the barrel nut 35 (shown in FIG. 5). The threaded portion 120 is formed on the outer surface of the mounting protrusion 105.

According to some embodiments, the barrel nut 35 is inserted over the barrel 25 and the upper receiver 20. According to some embodiments, the barrel nut 35 is configured to fasten the barrel 25 to the upper receiver 20. According to some embodiments, the barrel nut 35 is cooperatively sized and configured with the handguard 30 to removably engage the handguard 30 with the barrel nut 35. According to some embodiments, the barrel nut 35 is configured to be removably or permanently coupled to the upper receiver 20. According to some embodiments, the barrel nut 35 is removably attached to the upper receiver 20 via a threaded connection, as described below in further detail. According to some embodiments, the barrel nut 35 is a generally tubular structure.

According to some embodiments, the barrel nut 35 has a receiver end 130 and a barrel end 135. The receiver end 130 is positioned opposite to the barrel end 135 along the longitudinal axis of the barrel nut 35. According to some embodiments, the barrel nut 35 is fastened to the upper receiver 20 in a manner that the receiver end 130 is arranged adjacent the upper receiver 20 and the barrel end 135 is arranged away from the upper receiver 20 along the longitudinal axis A of the firearm 10.

According to some embodiments, the barrel nut 35 includes a tool locking portion 140. The tool locking portion 140 of the barrel nut 35 is configured to engage and interlock with the barrel installation tool (not shown).

FIG. 5 depicts is a cross-sectional view of the barrel nut 35 according to some embodiments presently disclosed. According to some embodiments, the barrel nut 35 comprises the internal threads 125 and a barrel locking lug 145. The internal threads 125 is formed on a portion of the inner surface of the barrel nut 35 adjacent the receiver end 130 and configured to removably engage the complementary threaded portion 120 of the mounting protrusion 105. The barrel locking lug 145 is annually formed around the inner surface of the barrel nut 35 and extends radially inwards from the inner surface of the barrel nut 35 adjacent the internal threads 125. The barrel locking lug 145 is configured to be abutted against the engaging flange 100 when the barrel nut 35 is fastened onto the mounting protrusion 105.

According to some embodiments, the barrel nut 35 is screwed onto the upper receiver 20 by slipping the barrel nut 35 over the barrel 25 and screwing onto the mounting protrusion 105 by engaging the internal threads 125 with the threaded portion 120 of the mounting protrusion 105. The engaging flange 100 of the barrel 25 is thereby trapped between the barrel locking lug 145 and the lip 115 of the mounting protrusion 105. Accordingly, the barrel 25 may be held to the upper receiver 20 by trapping the engaging flange 100 against the mounting protrusion 105 of the upper receiver 20 with the barrel nut 35.

According to some embodiments, a user can hold the outer surface, such as, for example, the tool locking portion 140, of the barrel nut 35 and thread the barrel nut 35 over the mounting protrusion 105. The barrel nut 35 may be tightened by hand onto the mounting protrusion 105 by turning the barrel nut 35 as hard as possible. According to some embodiments, the barrel installation tool (not shown) is inserted onto the barrel nut 35 to engage the tool locking portion 140 of the barrel nut 35 and, then, the barrel installation tool is turned by hand to tighten the barrel nut 35 onto the mounting protrusion 105. The barrel nut 35 is tightened onto the mounting protrusion 105 by turning the barrel installation tool as hard as possible up to a predetermined tension. According to some embodiments, a user may repeat tightening and loosening of the barrel nut 35 several times using the barrel installation tool to further ensure the attachment of the barrel nut 35 onto the upper receiver 20.

Once the barrel nut 35 is tightened against the upper receiver 20, the user can install the gas tube 50 between the gas block 48 and the gas tube hole 73 of the upper receiver 20. After the gas tube 50 is installed, a bolt carrier assembly may be installed within the upper receiver 20. Further, the user can insert the handguard 30 over the barrel 25 and slide the handguard 30 onto the barrel nut 35 while the gas tube 50 is aligned with the gas tube slot 45 of the handguard 30. According to some embodiments, the barrel nut 35 and the handguard 30 are configured to be engaged with a close fit.

According to some embodiments, when the handguard 30 is installed onto the barrel nut 35, the splines 60 and the channels 65 of the barrel nut 35 engage the one or more protrusions 70 (shown in FIGS. 3*a*-*b*, 6*a*-*b* and 7) of the handguard assembly 30. According to some embodiments, when the handguard 30 is installed onto the barrel nut 35, the one or more protrusions 70 are positioned within the one or more channels 65 of the barrel nut 35 (shown in FIGS. 3*a-b*, 6*a-b* and 7). According to some embodiments, when the handguard 30 is installed onto the barrel nut 35, the channels 65 of the barrel nut 35 align with the one or more protrusions 70 (shown in FIGS. 3*a-b*, 6*a-b* and 7) of the handguard assembly 30.

According to some embodiments, the one or more protrusions 70 and the one or more channels 65 are configured to be engaged with a close fit. According to some embodiments, the one or more protrusions 70 and the one or more splines 60 are configured to be engaged with a close fit.

According to some embodiments, the handguard 30 has a receiver end 150 and a barrel end 155. The receiver end 150 is positioned opposite to the barrel end 155 along the longitudinal axis of the handguard 30. According to some embodiments, the handguard 30 is fastened to the barrel nut 35 in a manner that the receiver end 150 is arranged adjacent the upper receiver 20 and the barrel end 155 is arranged away from the upper receiver 20 along the longitudinal axis A of the firearm 10.

According to some embodiments, the one or more apertures 38 are located adjacent to the receiver end 150 of the handguard 30. According to some embodiments, the one or more apertures 38 are located at the receiver end 150 of the handguard 30.

According to some embodiments, the handguard 30 is a generally tubular structure. According to some embodiments, the receiver end 150 of the handguard 30 comprises a slit 180. According to some embodiments, the receiver end 150 of the handguard 30 comprises a slit 180 that separates section 185 of the handguard 30 from section 190 of the handguard 30. According to some embodiments, the receiver end 150 of the handguard 30 comprises a slit 180 that separates the receiver end 150 in to section 185 and section 190. According to some embodiments, the receiver end 150 of the handguard 30 comprises a slit 180 that separates the receiver end 150 into C-shaped structure.

According to some embodiments, when the handguard 30 is installed onto the barrel nut 35, the one or more fasteners 40 are tightened to fasten the handguard 30 to the barrel nut 35. According to some embodiments, when the handguard 30 is installed onto the barrel nut 35, the one or more fasteners 40 are tightened to minimize the slit 180. According to some embodiments, when the handguard 30 is installed onto the barrel nut 35, the one or more fasteners 40 are tightened to minimize the distance between the section 185 and the section 190 of the handguard 30.

According to some embodiments, when the one or more fasteners 40 are tightened the one or more protrusions 70 are squeezed closer together. According to some embodiments, when the one or more fasteners 40 are tightened the one or more protrusions 70 are squeezed closer together for a tighter connection with the one or more splines 60 of the barrel nut 35. According to some embodiments, the one or more fasteners 40 are tightened to create a tighter connection between the one or more protrusions 70 of the handguard 30 and the one or more splines 60 of the barrel nut 35. According to some embodiments, the one or more fasteners 40 are tightened to create a tighter connection between the one or more protrusions 70 of the handguard 30 and the one or more splines 60 of the barrel nut 35 and to prevent the handguard 30 from rotating about the barrel nut 35. According to some embodiments, friction between the one or more protrusions 70 of the handguard 30 and the one or more splines 60 of the barrel nut prevents the handguard 30 from rotating about the barrel nut 35. According to some embodiments, friction between the one or more protrusions 70 of the handguard 30 and the one or more splines 60 of the barrel nut 35 prevents the handguard 30 from being removed from the barrel nut 35. According to some embodiments, when the one or more fasteners 40 are tightened, friction increases between the one or more protrusions 70 of the handguard 30 and the one or more splines 60 of the barrel nut 35.

According to some embodiments presently disclosed, a tool 200 (shown in FIGS. 8-19) is used to make sure that the top of the handguard 30 aligns with the top of the upper receiver 20. According to some embodiments presently disclosed, a tool 200 (shown in FIGS. 8-19) is used to make sure that one or more rails 34 of the handguard 30 aligns with the top of the upper receiver 20. According to some embodiments presently disclosed, a tool 200 (shown in FIGS. 8-19) is used to make sure that one or more rails 34 of the handguard 30 aligns with the one or more rails 215 of the upper receiver 20. According to some embodiments presently disclosed, a tool 200 (shown in FIGS. 8-19) is used to make sure that the one or more protrusions 70 of the handguard aligns with the one or more channels 65 of the barrel nut 35.

According to some embodiments, the tool 200 comprises one or more protrusions 205 positioned to engage the splines 60 and the channels 65 of the barrel nut 35. According to some embodiments, the tool 200 comprises one or more protrusions 205 positioned to fit in to the channels 65 of the barrel nut 35.

According to some embodiments, the tool 200 comprises one or more protrusions 210 positioned to engage a first portion of the upper receiver 20. According to some embodiments, the one or more protrusions 210 are shaped to match and engage the first portion of the upper receiver 20.

According to some embodiments, the tool 200 comprises one or more protrusions 210 positioned to engage the one or more rails 215 of the upper receiver 20. According to some embodiments, the one or more protrusions 210 are shaped to match and engage the one or more rails 215 of the upper receiver 20.

According to some embodiments, the one or more protrusions 205 of the tool 200 are slid along the one or more channels 65 of the barrel nut 35 to make sure the one or more protrusions 210 of the tool 200 engage the first portion of the upper receiver 20. According to some embodiments, the one or more protrusions 205 of the tool 200 are slid along the one or more channels 65 of the barrel nut 35 to make sure the one or more protrusions 210 of the tool 200 align with the first portion of the upper receiver 20. According to some embodiments, the one or more protrusions 205 of the tool 200 are slid along the one or more channels 65 of the barrel nut 35 to make sure the one or more protrusions 210 of the tool 200 align with the one or more rails 215 of the upper receiver 20.

According to some embodiments, the one or more protrusions 205 of the tool 200 are positioned in the one or more channels 65 of the barrel nut 35 to make sure the one or more protrusions 210 of the tool 200 engage the first portion of the upper receiver 20. According to some embodiments, the one or more protrusions 205 of the tool 200 are positioned in the one or more channels 65 of the barrel nut 35 to make sure the one or more protrusions 210 of the tool 200 align with the first portion of the upper receiver 20. According to some embodiments, the one or more protrusions 205 of the tool 200 are positioned in the one or more channels 65 of the barrel nut 35 to make sure the one or more protrusions 210 of the tool 200 align with the one or more rails 215 of the upper receiver 20.

While several illustrative embodiments of the invention have been shown and described, numerous variations and alternative embodiments will occur to those skilled in the art. Such variations and alternative embodiments are contemplated, and can be made without departing from the scope of the invention as defined in the appended claims.

As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

What is claimed is:

1. A firearm comprising:
   an upper receiver;
   a barrel;
   a handguard assembly defining an opening configured to accommodate a portion of the barrel, wherein the handguard assembly comprises one or more protrusions extending into the opening; and
   a monolithic barrel nut coupling the barrel with the upper receiver, wherein the monolithic barrel nut comprises a plurality of longitudinally-extending splines and a plurality of longitudinally-extending channels formed along an outer surface of the monolithic barrel nut, wherein the splines and the channels operate to engage the one or more protrusions of the handguard assembly;
   wherein the monolithic barrel nut comprises a tool locking portion; and
   wherein one of the one or more protrusions is positioned between two of the longitudinally-extending splines and within one of the longitudinally-extending channels.

2. The firearm of claim 1, wherein the handguard assembly comprises a first section and a second section separated by a first distance.

3. The firearm of claim 2, wherein friction between the one or more protrusions of the handguard assembly and the splines and the channels of the monolithic barrel nut increases as the first distance is reduced.

4. The firearm of claim 1, wherein the handguard assembly comprises a receiver end, wherein the receiver end comprises a first section and a second section separated by a first distance.

5. The firearm of claim 4, further comprising one or more fasteners configured to reduce the first distance.

6. The firearm of claim 1, wherein the one or more protrusions run the entire length of the handguard assembly.

7. The firearm of claim 1, wherein the one or more protrusions are integral with the handguard assembly.

8. The firearm of claim 1, wherein the monolithic barrel nut comprises a receiver end and a barrel end, wherein the plurality of longitudinally-extending splines and the plurality of longitudinally-extending channels are positioned adjacent to the receiver end, wherein the plurality of longitudinally-extending splines and the plurality of longitudinally-extending channels are positioned adjacent to the barrel end.

9. A monolithic barrel nut comprising:
   an internal thread configured to engage a portion of an upper receiver;
   a tool locking portion;
   a first plurality of longitudinally-extending splines formed along an outer surface of the monolithic barrel nut;
   a first plurality of longitudinally-extending channels formed along the outer surface of the monolithic barrel nut;
   a second plurality of longitudinally-extending splines formed along the outer surface of the monolithic barrel nut; and
   a second plurality of longitudinally-extending channels formed along the outer surface of the monolithic barrel nut;
   wherein the splines and the channels operate to engage one or more protrusions of a handguard assembly and prevent rotation of the handguard assembly; and
   wherein the tool locking portion is positioned between the first plurality of longitudinally-extending splines and the second plurality of longitudinally-extending splines.

10. The monolithic barrel nut of claim 9, further comprising a receiver end and a barrel end, wherein the first plurality of longitudinally-extending splines and the fast plurality of longitudinally extending channels are positioned adjacent to the receiver end, and wherein the second plurality of longitudinally extending splines and the second plurality of longitudinally-extending channels are positioned adjacent to the barrel end.

11. A firearm comprising:
   an upper receiver;
   a barrel;
   a handguard assembly defining an opening configured to accommodate a portion of the barrel, wherein the handguard assembly comprises one or more protrusions extending into the opening, wherein the handguard assembly comprises a first section and a second section separated by a first distance; and
   a monolithic barrel nut coupling the barrel with the upper receiver, wherein the monolithic barrel nut comprises a plurality of longitudinally-extending splines and a plurality of longitudinally-extending channels formed along an outer surface of the monolithic barrel nut, wherein the splines and the channels operate to engage the one or more protrusions of the handguard assembly;
   wherein one of the one or more protrusions is positioned between two of the longitudinally-extending splines and within one of the longitudinally-extending channels.

12. The firearm of claim 11, wherein the handguard assembly comprises a receiver end, wherein the receiver end comprises the first section and the second section separated by the first distance.

13. The firearm of claim 11, further comprising one or more fasteners configured to reduce the first distance.

14. The firearm of claim 11, wherein friction between the one or more protrusions of the handguard assembly and the splines and the channels of the monolithic barrel nut increases as the first distance is reduced.

15. The firearm of claim 11, wherein the one or more protrusions run the entire length of the handguard assembly.

16. The firearm of claim 11, wherein the one or more protrusions are integral with the handguard assembly.

17. The firearm of claim 11, wherein the monolithic barrel nut comprises a receiver end and a barrel end, wherein the plurality of longitudinally-extending splines and the plurality of longitudinally-extending channels are positioned adjacent to the receiver end, wherein the plurality of longitudinally-extending splines and the plurality of longitudinally-extending channels are positioned adjacent to the barrel end.

* * * * *